US009771049B2

(12) United States Patent
Lee et al.

(10) Patent No.: US 9,771,049 B2
(45) Date of Patent: Sep. 26, 2017

(54) CUSHION OF PASSENGER AIR-BAG APPARATUS

(71) Applicant: Hyundai Mobis Co., Ltd., Seoul (KR)

(72) Inventors: Seok Min Lee, Yongin-si (KR); Hae Kwon Park, Yongin-si (KR); Sang Won Hwangbo, Goyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/298,650

(22) Filed: Oct. 20, 2016

(65) Prior Publication Data

US 2017/0113646 A1    Apr. 27, 2017

(30) Foreign Application Priority Data

Oct. 21, 2015    (KR) .................. 10-2015-0146433

(51) Int. Cl.
| | | |
|---|---|---|
| *B60R 21/214* | (2011.01) | |
| *B60R 21/2338* | (2011.01) | |
| *B60R 21/231* | (2011.01) | |
| *B60R 21/213* | (2011.01) | |
| *B60R 21/232* | (2011.01) | |
| *B60R 21/233* | (2006.01) | |
| *B60R 21/16* | (2006.01) | |
| *B60R 21/00* | (2006.01) | |

(52) U.S. Cl.
CPC ........ *B60R 21/2338* (2013.01); *B60R 21/213* (2013.01); *B60R 21/231* (2013.01); *B60R 21/232* (2013.01); *B60R 21/233* (2013.01); *B60R 21/214* (2013.01); *B60R 2021/0044* (2013.01); *B60R 2021/0048* (2013.01); *B60R 2021/161* (2013.01); *B60R 2021/23324* (2013.01); *B60R 2021/23382* (2013.01); *B60R 2021/23386* (2013.01)

(58) Field of Classification Search
CPC . B60R 21/213; B60R 21/214; B60R 21/2338; B60R 21/233; B60R 2021/23382
See application file for complete search history.

(56) References Cited

U.S. PATENT DOCUMENTS 2,834,606 A * 5/1958 Bertrand ................. B60R 21/16
  206/522
6,460,878 B2 * 10/2002 Eckert ................... B60R 21/232
  280/730.1

(Continued)

FOREIGN PATENT DOCUMENTS

KR    10-2012-0045647    5/2012

*Primary Examiner* — Faye M Fleming
(74) *Attorney, Agent, or Firm* — H.C. Park & Associates, PLC (57) ABSTRACT

A cushion of a passenger air-bag apparatus includes a cushion body section including an upper chamber portion that is deployed downwardly along a windscreen from a roof, and a lower chamber portion that is formed to be connected with a lower portion of the upper chamber portion, is formed to be in contact with an upper portion of a crush pad, and formed to be deployed toward a seated person; and an inner tether section installed inside the cushion body section to divide the upper chamber portion and the lower chamber portion, and configured to have a communication hole portion forming a path through which the air is introduced from the upper chamber portion to the lower chamber portion.

13 Claims, 5 Drawing Sheets

(56) References Cited

U.S. PATENT DOCUMENTS

| | | | |
|---|---|---|---|
| 8,328,228 B2* | 12/2012 | Lee | B60R 21/214 |
| | | | 280/729 |
| 8,393,637 B2* | 3/2013 | Choi | B60R 21/214 |
| | | | 280/730.1 |
| 2006/0163848 A1* | 7/2006 | Abe | B60R 21/231 |
| | | | 280/729 |
| 2010/0225096 A1* | 9/2010 | Bustos Garcia | B60R 21/214 |
| | | | 280/730.1 |
| 2012/0049491 A1* | 3/2012 | Yoo | B60R 21/214 |
| | | | 280/729 |
| 2014/0015230 A1* | 1/2014 | Le Norcy | B60R 21/23 |
| | | | 280/728.1 |

* cited by examiner

CUSHION OF PASSENGER AIR-BAG APPARATUS

CROSS-REFERENCE TO RELATED APPLICATION

This application claims priority from and the benefit of Korean Patent Application No. 10-2015-0146433, filed on Oct. 21, 2015, which is hereby incorporated by reference for all purposes as if fully set forth herein.

BACKGROUND

Field

Exemplary embodiments of the present invention relate to an air-bag apparatus, and more particularly, to a cushion of a passenger air-bag apparatus for preventing injury of a person seated on a passenger seat at a time of a vehicle collision.

Discussion of the Background

An air-bag apparatus for a vehicle refers to a safety apparatus which deploys an is air-bag cushion to mitigate an impact to a passenger in an event of a vehicle collision. The airbag apparatus may be categorized into a driver air-bag (DAB), a passenger air-bag (PAB), a side air-bag (SAB), a curtain air-bag (CAB), or the like.

The above information disclosed in this Background section is only for enhancement of understanding of the background of the inventive concepts. Therefore, it may contain information that does not form the prior art that is already known in this country to a person of ordinary skill in the art.

SUMMARY

Exemplary embodiments are directed to a cushion of a passenger air-bag apparatus that can be stably deployed to a location facing an upper body of a passenger from the roof, and variably applied in a variety of deployment forms according to a particular type of a vehicle.

An exemplary embodiment of the present invention discloses a cushion of a passenger air-bag apparatus, including a cushion body section including an upper chamber portion that is deployed downwardly along a windscreen from a roof, and a lower chamber portion that is formed to be connected with a lower portion of the upper chamber portion, is formed to be in contact with an upper portion of a crush pad, and is formed to be deployed toward a seated person; and an inner tether section installed inside the cushion body section to divide the upper chamber portion and the lower chamber portion, and configured to have a communication hole portion forming a path through which the air is introduced from the upper chamber portion to the lower chamber portion.

The forgoing general description and the following detailed description are is exemplary and explanatory and are intended to provide further explanation of the claimed subject matter.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Hereinafter, exemplary embodiments of the present invention will be described in detail with reference to the accompanying drawings. Throughout the specification, like is reference numerals denote like elements having the same or similar functions. Detailed description of components or functions apparent to those skilled in the art will be omitted for clarity. It should be understood that the following exemplary embodiments are provided by way of example and that the present invention is not limited to the exemplary embodiments disclosed herein and can be implemented in different forms by those skilled in the art. It should be noted that the drawings are not to precise scale and may be exaggerated in thickness of lines or sizes of components for descriptive convenience and clarity only.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention is a part. Terms, such as those defined in commonly used dictionaries, should be interpreted as having a meaning that is consistent with their meaning in the context of the relevant art and will not be interpreted in an idealized or overly formal sense, unless expressly so defined herein.

In general, a passenger air-bag is deployed at a passenger seat side or at the passenger seat side roof to prevent a head of the seated person from being excessively folded. At the roof, the air-bag has to be more remotely deployed to a position to face the seated person's face and chest. However, gravity makes it difficult for the passenger air-bag to be stably deployed as desired without sagging. The following exemplary embodiments solve the above-described problem.

Figure 1:
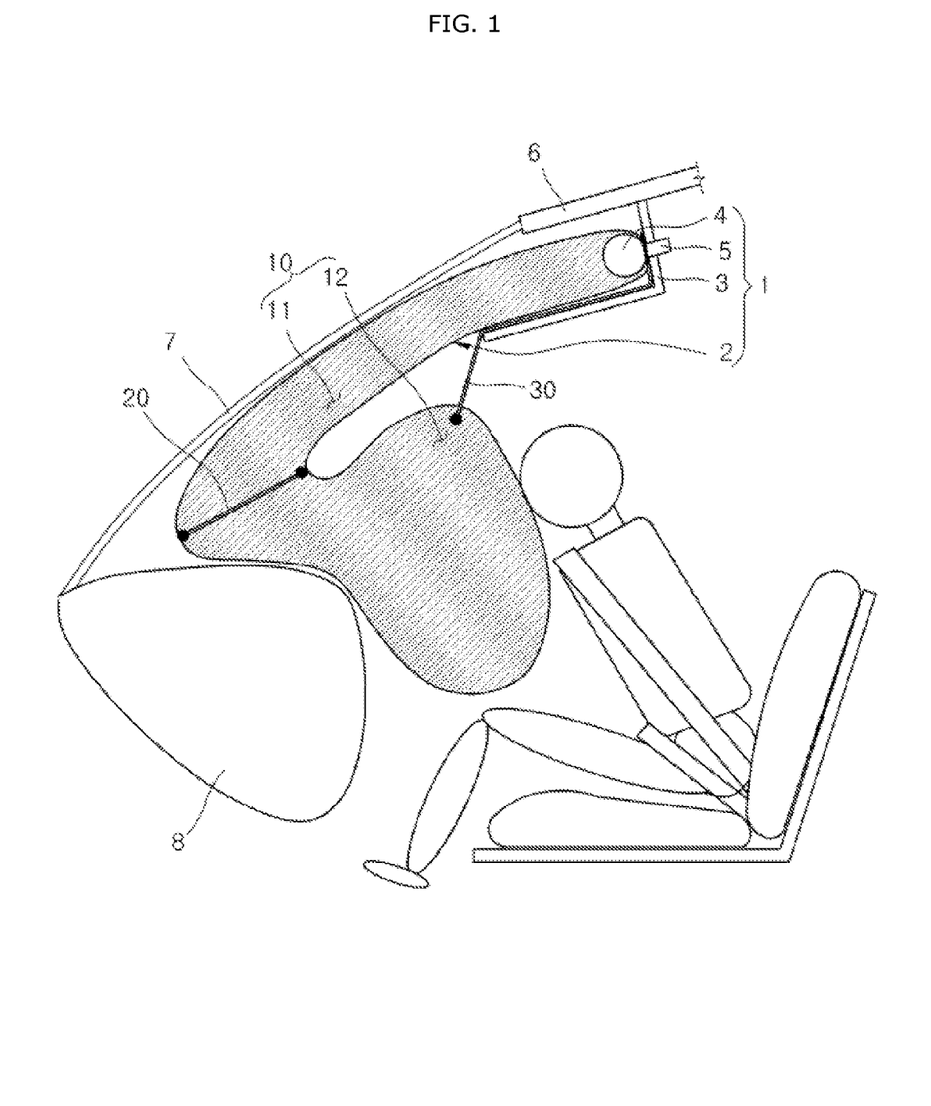
FIG. 1 is a side view schematically illustrating a deployment state of a cushion of a passenger air-bag apparatus according to an exemplary embodiment.
Figure 2:
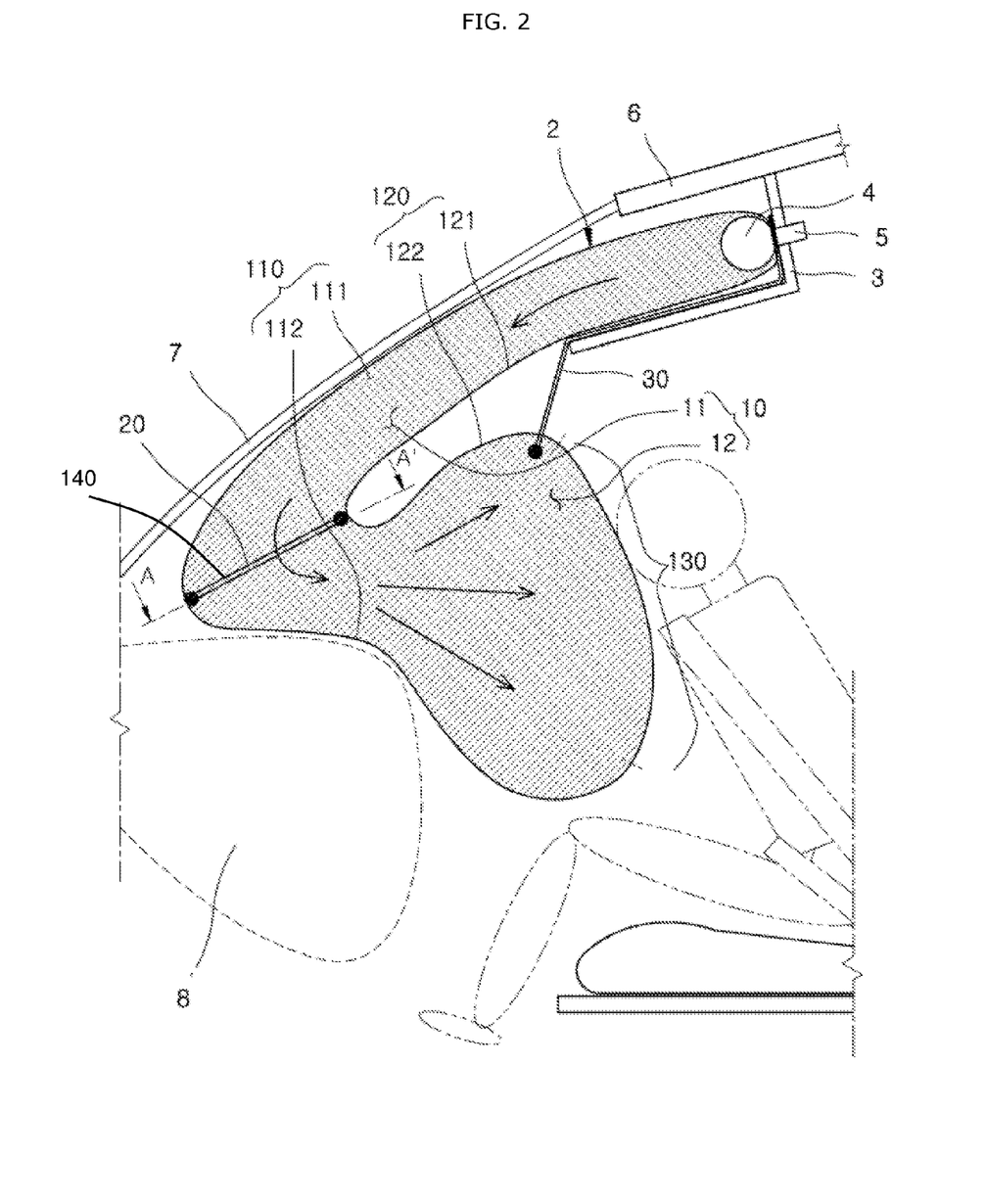
FIG. 2 is a concept view illustrating a deployment process of a cushion of a passenger air-bag apparatus according to an exemplary embodiment.
Figure 3:
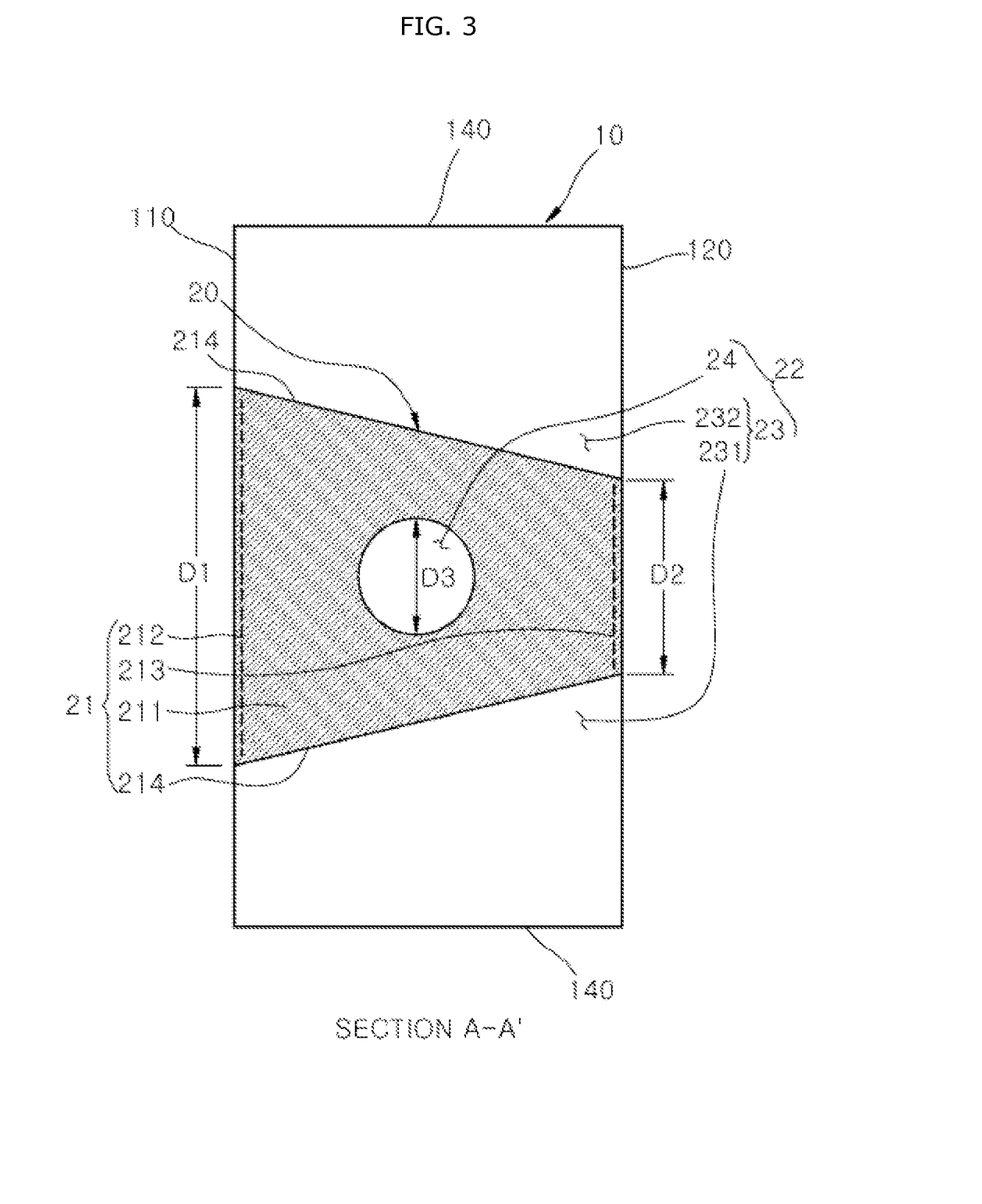
FIG. 3 is a cross-sectional view schematically illustrating an inner tether portion of a cushion of a passenger air-bag apparatus according to an exemplary embodiment, taken along line A-A'.

FIG. 1 is a side view schematically illustrating a deployment state of a cushion of a passenger air-bag apparatus according to an exemplary embodiment. FIG. 2 is a concept view illustrating a deployment process of a cushion of a passenger air-bag apparatus according to an exemplary embodiment. FIG. 3 is a cross-sectional view schematically illustrating an inner tether portion of a cushion of a passenger air-bag apparatus according to an exemplary embodiment, taken along line A-A'.

Figure 4:
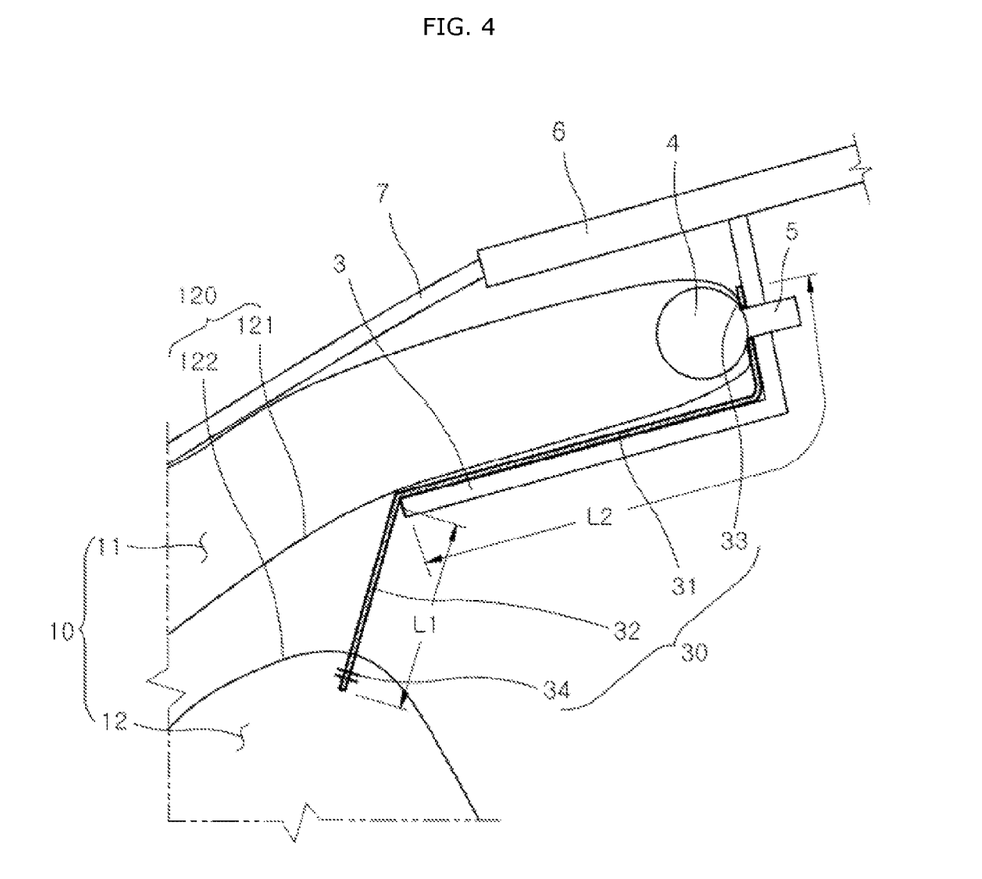
FIG. 4 is a side view schematically illustrating an outer tether portion of a cushion of a passenger air-bag apparatus according to an exemplary embodiment.
Figure 5:
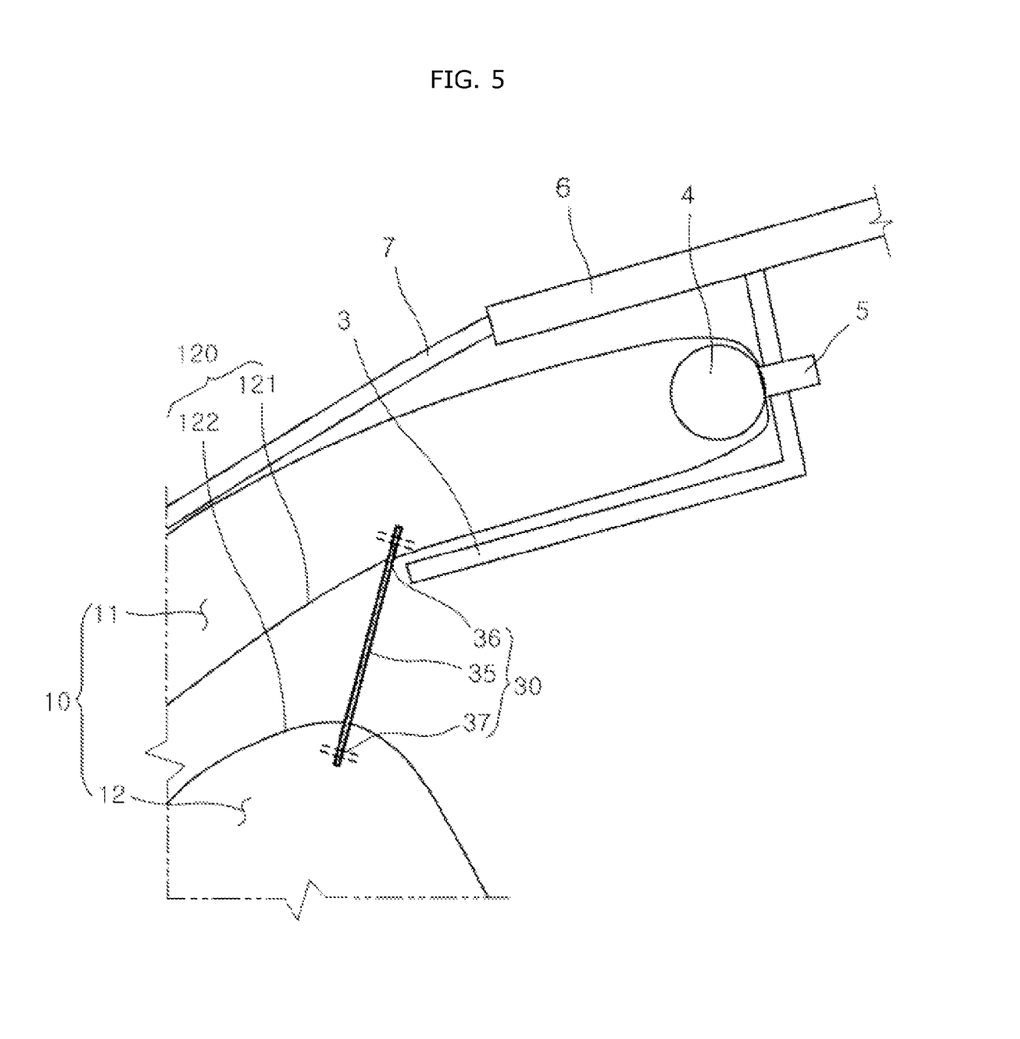
FIG. 5 is a side view schematically illustrating an outer tether portion of a cushion of a passenger air-bag apparatus according to an exemplary embodiment.

FIG. 4 is a side view schematically illustrating an outer tether portion of a cushion of a passenger air-bag apparatus according to an exemplary embodiment. FIG. 5 is a side view schematically illustrating an outer tether portion of a cushion of a passenger air-bag apparatus according to an exemplary embodiment.

As illustrated in FIG. 1, a passenger air-bag apparatus 1 according to an exemplary embodiment of the present invention is installed at a roof 6 of a vehicle, and includes a cushion 2, a housing 3 in which the cushion 2 is accommodated in a folded state, and an inflator 4 for discharging the air to the inside of the cushion 2.

When the inflator 4 is operated at a time of a vehicle collision, the cushion 2 is drawn out in front of the housing 3. At this time, the cushion 2 may be deployed downwardly to a space formed among a windscreen 7, a crush pad 8, and the seated person, and support the upper body of the seated person leaning forward. The front of the housing 3 is extended to the same direction as the front of the vehicle or toward the left-hand side of FIG. 1.

As illustrated in FIG. 2, the cushion 2 of the passenger air-bag apparatus 1, according to an exemplary embodiment, includes a cushion body section 10, an inner tether section 20, and an outer tether section 30.

The cushion body section 10 may be expanded by the air supplied from the inflator 4 to mitigate the impact at a time of a vehicle collision. The cushion body section 10 according to an exemplary embodiment includes an upper chamber portion 11 of a panel shape, which is deployed downwardly from the roof 6 along the windscreen 7, and a lower chamber portion 12 of a block shape, which is formed to be connected to a lower part of the upper chamber portion 11. The lower chamber portion 12 maybe in contact with an upper part of the crush pad 8 and may be deployed toward the seated person side.

The inner tether section 20 may be installed inside the cushion body section 10. The cushion body section 10 may be divided into the upper chamber portion 11 and the lower chamber portion 12 by the inner tether section 20. In other words, a region of the cushion body section 10 disposed at an upper side of the inner tether section 20 corresponds to the upper chamber portion 11 and a region of the cushion body section 10 disposed at a lower side of the inner tether section 20 corresponds to the lower chamber portion 12.

As illustrated in FIG. 3, a vent hole portion 24 may be formed in the inner tether section 20. The air of the upper chamber portion 11 may move to the lower chamber portion 12 through the vent hole portion 24. Accordingly, the inner tether section 20 does not deploy the upper chamber portion 11 and the lower chamber portion 12 at the same time, and thereby delays the deployment of the lower chamber portion 12 compared to the deployment of the upper chamber portion 11.

The air supplied from the inflator 4 first deploys the upper chamber portion 11 is and is partitioned by the inner tether section 20. Subsequently, the air passes through the vent hole portion 24 of the inner tether section 20 and is supplied to the lower chamber portion 12 to inflate the lower chamber portion 12.

In this way, the upper chamber portion 11 and the lower chamber portion 12 are deployed in sequence by the inner tether section 20. In other words, after the upper chamber portion 11 is deployed downwardly along the windscreen 7, the lower chamber portion 12 is deployed toward the seated person while being supported by the upper portion of the crush pad 8. Accordingly, the deployment of the cushion body section 10 including the upper chamber portion 11 and the lower chamber portion 12 may be reliably realized in a form in which the cushion body section 10 is stably sandwiched in a space between the windscreen 7 and the crush pad 8.

In addition, the upper chamber portion 11 is sandwiched between the windscreen 7 and the crush pad 8 while being deployed downwardly along the windscreen 7. Therefore, the deployment stability of the lower chamber portion 12 can be improved by the sandwiching the upper chamber portion 11 between the windscreen 7 and the crush pad 8.

As illustrated in FIG. 2, a lower portion of the upper chamber portion 11 may have a width corresponding to a width of the inner tether section 20. Similarly, a front portion of the lower chamber portion 12 may have a width corresponding to the width of the inner tether section 20. The inner tether section 20 may prevent a front portion 110 and a rear portion 120 of the cushion body section 10 from being spaced apart by a random width. In other words, the desired shape of the deployed cushion body section 10 may be controlled by the width of the inner tether section 20, which controls the position of the front portion 110 and the rear portion 120 of the deployed cushion body section 10. Here, the front portion 110 of the cushion body is section 10 refers to a surface facing the front of the vehicle, and the rear portion 120 refers to a surface facing the rear of the vehicle.

The outer tether section 30 may be a section connected to the lower chamber portion 12 so as to constrain the sagging of the lower chamber portion 12. The outer tether section 30 may be connected to the lower chamber portion 12 at an upper side of the lower chamber portion 12. The outer tether section 30 may pull the lower chamber portion 12 up, toward the housing 3. Since the lower chamber portion 12 is prevented from being sagged down to the head of the seated person by the outer tether section 30, the deployment of the cushion body section 10 can be reliably made in the desired form, as illustrated in FIG. 2.

As illustrated in FIGS. 2 and 3, the cushion body section 10 may include a front portion 110, a rear portion 120, a loading portion 130, and a side portion 140.

The front portion 110 may be a portion constituting the front portion of the cushion body section 10 facing the windscreen 7. The front portion 110 may form a front portion of the upper chamber portion 11 adjacent to the windscreen 7, and a lower portion of the lower chamber portion 12 adjacent to the crush pad 8. According to an exemplary embodiment, the front portion110 includes an upper front part 111 of the upper chamber portion 11 and a lower front part 112 of the lower chamber portion 12.

The upper front part 111 is a part constituting the front portion of the upper chamber portion 11. The upper front part 111 extends downward (at an incline) and along the windscreen 7. The lower front part 112 is a part constituting a lower portion of the lower chamber portion 12. The lower front part 112 is formed at a lower portion of the upper front part 111 after the upper front part 111 is formed. The lower front part 112 has a shape that conforms to the crush pad 8 and extends and bends toward the seated person in the passenger is seat. The lower front part 112 may be formed with and connected to the lower portion of the loading portion 130.

The rear portion 120 is a portion constituting a rear portion of the cushion body section 10 facing the seated person. The rear portion 120 may form a rear portion of the upper chamber portion 11 and an upper portion of the lower chamber portion 12. The rear portion of the upper chamber portion 11 and the upper portion of the lower chamber portion 12 form a shape mutually facing with each other. In other words, the rear portion 120 forms a curved U-letter shape.

Because the upper chamber portion 11 and the lower chamber portion 12 may form a structure of a U-letter shape, the air supplied from the inflator 4 is supplied to the lower chamber portion 12 through the upper chamber portion 11 delaying the air supplied to the lower chamber portion 12.

The rear portion 120 according to an exemplary embodiment includes an upper rear part 121 and a lower rear part 122.

The upper rear part 121 is a part constituting a rear part of the upper chamber portion 11. The upper rear part 121 extends in parallel with the upper front part 111. More specifically, the upper rear part 121 is guided along a lower portion of the housing 3 installed at the roof 6 to extend toward the windscreen 7. The lower rear part 122 is a part constituting an upper part of the lower chamber portion 12. The lower rear part 122 is formed with and connected to the upper rear part 121. The lower rear part 122 faces the upper rear part 121. The lower rear part 122 is formed with and connected to an upper portion of the loading portion 130.

The loading portion 130 is a portion to support the head and/or chest of the seated is person that are inclined forward. The loading portion 130 is a portion constituting a rear portion of the lower chamber portion 12. The loading portion 130 is formed to connect the front portion 110 and rear portion 120 to face the seated person. The loading portion 130 is formed in a width on which the head and chest of the seated person inclined forward can be loaded at a time of a vehicle collision.

The side portion 140 is formed with the front portion 110 and the rear portion 120 that have the above-described shapes and with a left side portion and right side portion of the loading portion 130. The front portion 110, the rear portion 120, the loading portion 130, and the side portion 140 form the outer shape of the cushion body section 10 together.

As illustrated in FIGS. 2 and 3, the inner tether section 20, according to an exemplary embodiment, includes an inner tether 21 and a communication hole portion 22.

The inner tether 21 is a member installed inside the cushion body section 10 to divide the cushion body section 10 into the upper chamber portion 11 and the lower chamber portion 12 (see FIG. 1). The inner tether 21 is disposed in a boundary region of the upper chamber portion 11 and the lower chamber portion 12. As illustrated in FIG. 3, the inner tether 21 includes a tether body part 211, a front coupling part 212, and a rear coupling part 213.

The tether body part 211 forms a main body of the inner tether 21 and has a shape of a panel. The tether body part 211 may include a material that can be flexibly deformed by the internal air pressure of the cushion body section 10, such as a fiber material. The tether body part 211 is installed across the interior of the cushion body section 10 to form a set angle with a lower portion of the windscreen 7 and an upper portion of the crush pad 8.

As the tether body part 211 is installed to form the set angle with the lower portion of the windscreen 7, a space in which the upper chamber portion 11 can be deployed may is be secured between the tether body part 211 and the windscreen 7 and the air can flow through the upper chamber portion 11. Similarly, as the tether body part 211 is installed to form a set angle with the upper portion of the crush pad 8, a space in which the lower chamber portion 12 can be deployed may be secured between the tether body part 211 and the crush pad 8 and the air can flow through the lower chamber portion 12.

The front coupling part 212 couples a front end portion of the tether body part 211 to a front portion 110 of the cushion body section 10 using a bonding method, such as sewing. The rear coupling part 213 couples a rear end portion of the tether body part 211 to a rear portion 120 of the cushion body section 10 using a bonding method, such as sewing.

The side spacing part 214 corresponds to a side portion of the tether body part 211, in which the front coupling part 212 and the rear coupling part 213 are not formed. In accordance with this, an opened portion, that is, the communication hole portion 22 through which the air flows is formed between the side spacing part 214 and the cushion body section 10. In this description, the opened portion formed between the side spacing part 214 and the cushion body section 10 is referred to as a gap hole portion 23.

The communication hole portion 22 connects the upper chamber portion 11 to the lower chamber portion 12 to be communicated, and forms a flow path of the air. The air of the upper chamber portion 11 may be introduced into the lower chamber portion 12 through the communication hole portion 22. As illustrated in FIG. 3, the communication hole portion 22 includes the gap hole portion 23 and a vent hole portion 24 according to an exemplary embodiment.

The gap hole portion 23 is formed to be opened between a boundary portion of the inner tether 21 and the cushion body section 10. As illustrated in FIG. 3, the gap hole is portion 23 includes a first gap hole portion 231 and a second gap hole portion 232 according to an exemplary embodiment.

According to an exemplary embodiment, the tether body part 211 has a shape of an equilateral trapezoid of which width is gradually narrowed from the front coupling part 212 toward the rear coupling part 213, and is disposed to be spaced apart from the right side and left side portions of the cushion body section 10. At this time, the first gap hole portion 231 is formed between the side spacing part 214 and the left side portion of the cushion body section 10, and the second gap hole portion 232 is formed between the side spacing part 214 and the right side portion of the cushion body section 10.

Although, in an exemplary embodiment of the present invention, the tether body part 211 has a shape of an equilateral trapezoid, the tether body part 211 is not limited thereto according to the present invention. Even in a case that the tether body part 211 may has a shape of a parallelogram, a rectangle or the like, the gap hole portion 23 may be formed between the tether body part 211 and the cushion body section 10 by disposing the side spacing part 214 to be spaced apart from the cushion body section 10.

As described above, the sizes of the first gap hole portion 231 and the second gap hole portion 232 can be adjusted by modifying the shape of the tether body part 211 or adjusting the length D1 of the front coupling part 212 and the length D2 of the rear coupling part 213, and the flow and flow rate of the air flowing through the inner tether section 20 can be adjusted by using the left side portion and right side portion of the cushion body section 10.

The vent hole portion 24 is formed to penetrate the tether body part 211. The vent hole portion 24 forms an additional path through which the air passes at a position spaced apart from the gap hole portion 23. The vent hole portion 24 is formed at a central portion of is the tether body part 211 to penetrate in a circular shape according to an exemplary embodiment. The flow and flow rate of the air flowing across the tether body part 211 can be controlled by adjusting a diameter D3 of the vent hole portion 24.

As the first gap hole portion 231, the second gap hole portion 232, and the vent hole portion 24 are disposed at portions corresponding to the left side portion, right side portion and central portion of the cushion body section 10 to be distributed, the air in the upper chamber portion 11 can be dispersed evenly through the first gap hole portion 231, the second gap hole portion 232, and the vent hole portion 24 and can be introduced into the lower chamber portion 12. Accordingly, it is possible to prevent the air from being concentrated and introduced into a specific area, and prevent the lower chamber portion 12 from being deployed asymmetrically.

Since, in the inner tether section 20, the air flows mainly in a direction perpendicular to the installed angle of the tether body part 211, if the tether body part 211 is installed at a position where the flow direction of the air is changed, the change of the air flow direction can be made more stably by the tether body part 211.

If the tether body part 211 is installed at a boundary portion between the upper chamber portion 11 deployed to be inclined downward the front and the lower chamber portion 12 deployed to be inclined toward the rear in an angle that is set downward and toward the front of the vehicle, the change of the air flow direction can be made stably in a continuous U-shaped path, in an order of a direction inclined downward and toward to the front of the vehicle (to the upper chamber portion 11), a direction inclined downward to the rear of the vehicle (to the inner tether section 20), and a direct rear direction (to the lower chamber portion 12).

The air discharged from the inflator 4 into the upper chamber portion 11 flows downward to the crush pad 8 through the upper front part 111 and the windscreen 7. The upper is chamber portion 11 can be filled in the space between the windscreen 7 and the crush pad 8 by the air flow, and the seated person's weight loaded on the lower chamber portion 12 may be stably supported.

First, the air fills the inside of the upper chamber portion 11 due to the air flow being blocked by the inner tether 21. Second, the air is introduced into the lower chamber portion 12 through the communication hole portion 22. At this time, the lower front part 112 is deployed toward the rear side where the seated person is located while being bent from the upper portion of the crush pad 8 toward the rear portion of the crush pad 8. Accordingly, the lower chamber portion 12 can stably support the seated person's weight on the basis of the crush pad 8 of which the lower portion is folded.

As illustrated in FIG. 4, the outer tether section 30 according to an exemplary embodiment includes an upper extension portion 31, a lower extension portion 32, an assembly portion 33, and a bonding portion 34.

The upper extension portion 31 has a string shape and is disposed inside the housing 3. The lower extension portion 32 extends to outside of the housing 3 at a time of the deployment of the cushion body section 10, is formed in series with the upper extension portion 31, and is connected to the lower chamber portion 12. The upper extension portion 31 and lower extension portion 32 may include a material capable of supporting the deployment force of the cushion body section 10.

The lower extension portion 32 holds the lower chamber portion 12 to a set height in a state extended downward to the lower chamber portion 12 from a front end portion of the housing 3. The height of the lower chamber portion 12 can be controlled according to the length L1 of the lower extension portion 32. The upper extension portion 31 has a length L2 corresponding to the front-back direction length of the lower portion of the housing 3. The length L2 of the upper extension portion 31 can be variably adjusted according to the size and shape of the housing 3.

The assembly portion 33 is formed at an end portion of the upper extension portion 31, and coupled to a fastening section 5 between the inflator 4 and the housing 3. The fastening section 5 may use an inflator stud that includes a fastening member, such as a bolt or rivet, pin or the like, to fasten and fix the assembly portion 33 to the housing 3. The assembly portion 33 may have a hole part through which the fastening section 5 can penetrate and be installed in a shape jammed and inserted into the fastening section 5 between the inflator 4 and the housing 3. The upper extension portion 31 can be strongly and stably installed at a correct location because the assembly portion 33 is fastened to the fastening section 5 made of a hard material, such as a metal material.

The bonding portion 34 is formed at an end of the lower extension portion 32 and connected to the upper portion of the lower chamber portion 12. The bonding portion 34 may be formed by bonding a bottom part of the lower extension portion 32 to the lower rear part 122 by means of adhesion, sewing or the like.

According to an exemplary embodiment, the outer tether section 30 may have a structure bounded to the fastening section 5 between the inflator 4 and the housing 3 using the assembly portion 33, as described above. However, if the outer tether section 30 holds the lower chamber portion 12 to the set height, the outer tether section 30 may not be limited to a specific structure or shape as illustrated in FIG. 5.

As illustrated in FIG. 5, the outer tether section 30 may include an extension portion 35, an upper bonding portion 36, and a lower bonding portion 37.

The extension portion 35 has a of a string shape and is disposed at an upper side of the lower chamber portion 12. The extension portion 35 includes a material configured to support the deployment force of the cushion body section 10.

The upper bonding portion 36 is formed at an upper portion of the extension portion 35 and is bonded to the upper chamber portion 11. The upper bonding portion 36 may be formed by bonding the upper end of the extension portion 35 to the upper rear part 121 using a method, such as adhesion, sewing or the like. The lower bonding portion 37 is formed at a lower portion of the extension portion 35 and is bonded to the lower chamber portion 12. The lower bonding portion 37 may be formed by bonding the bottom end of the extension portion 35 to the lower rear portion 122 using a method, such as adhesion, sewing or the like.

The extension portion 35 holds the lower chamber portion 12 to a set height in a state extended downward from the upper chamber portion 11 toward the lower chamber portion 12. Thus, the height of the lower chamber portion 12 may be controlled according to the length L1 of the extension portion 35, on the basis of the upper chamber portion 11. The inner tether section 20 can be deployed easily and stably without interference of the housing 3 by bonding the upper end and lower end of the extension portion 35 to the upper chamber portion 11 and the lower chamber portion 12, respectively, from the outside of the housing 3.

According to an exemplary embodiment, the cushion 2 of the passenger air-bag apparatus 1 described above includes the upper chamber portion 11 deployed downwardly in a shape of a panel between the windscreen 7 and the crush pad 8, and the lower chamber portion 12 deployed rearward from a lower portion of the upper chamber portion 11 toward the seated person in a shape of a block. Therefore, the upper chamber portion 11 and the lower chamber portion 12 are deployed and inserted between the windscreen 7 and the crush pad 8 to be filled. Accordingly, an exemplary embodiment provides a passenger air-bag apparatus 1 that stably supports and buffers a seated person's upper body forced forward at a time of a vehicle collision.

In addition, according to an exemplary embodiment, the upper chamber portion 11 and the lower chamber portion 12 are formed to be separated using the inner tether section 20. Accordingly, the upper chamber portion 11 and the lower chamber portion 12 are deployed sequentially by introducing the air into the upper chamber portion 11. Therefore, the cushion body section 10 can be deployed reliably from the roof 6 to a location to face the seated person's upper body in a set form.

In addition, according to an exemplary embodiment, a deployment form of the cushion body section 10 can be variably applied according to various types of the vehicle by adjusting the shape and width of the inner tether 21 and the length of the outer tether section 30, and the deployment speed and air filling amount of the lower chamber portion 12 with respect to the upper chamber portion 11 can be adjusted variously by adjusting the width of the communication hole portion 22.

Furthermore, according to an exemplary embodiment, the lower chamber portion 12 on which the seated person's upper body leaning forward is loaded at a time of the vehicle collision is prevented from sagging down the passenger's head using the outer tether section 30. Accordingly, the lower chamber portion 12 can be located reliably at a set height set in consideration of the behavior of the seated person's upper body at a time of the vehicle collision.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A cushion of a passenger air-bag apparatus, comprising:
    a cushion body section comprising:
        an upper chamber portion that is deployed downwardly along a windscreen from a roof; and
        a lower chamber portion that is formed to be connected with a lower portion of the upper chamber portion, is formed to be in contact with an upper portion of a crush pad, and formed to be deployed toward a seated person; and
    an inner tether section installed inside the cushion body section to divide the upper chamber portion and the lower chamber portion, and configured to have a communication hole portion forming a path through which the air is introduced from the upper chamber portion to the lower chamber portion.

2. The cushion of a passenger air-bag apparatus of claim 1, wherein the cushion body section comprises:
    a front portion comprising a front part of the upper chamber portion in contact with the windscreen and a lower part of the lower chamber portion in contact with the crush pad;
    a rear portion comprising a rear part of the upper chamber portion and an upper part of the lower chamber portion; and
    a loading portion configured to connect the front portion and the rear portion of the cushion body section, and formed to face the seated person between the front portion and the rear portion.

3. The cushion of a passenger air-bag apparatus of claim 2, wherein the front portion of the cushion body section comprises:
    an upper front portion formed at a front portion of the upper chamber portion, and configured to extend to be inclined downwardly toward the front of a vehicle along the windscreen; and
    a lower front portion formed in succession with the upper front portion at a lower portion of the lower chamber portion, and configured to have a bent shape toward the seated person while being in contact with the crush pad and a lower portion of the loading portion.

4. The cushion of a passenger air-bag apparatus of claim 3, wherein a portion connecting the upper front portion and the lower front portion of the cushion body section is inserted between the windscreen and the crush pad at a time of deployment of the cushion body section.

5. The cushion of a passenger air-bag apparatus of claim 2, wherein the rear portion of the cushion body section comprises:
    an upper rear portion formed at a rear portion of the upper chamber portion and guided by a housing installed at the roof to extend toward the windscreen; and
    a lower rear portion formed at an upper portion of the lower chamber portion in succession with the upper rear portion, configured to face the upper rear portion, and connected with an upper portion of the loading portion.

6. The cushion of a passenger air-bag apparatus of claim 1, wherein the inner tether section comprises an inner tether installed at a boundary between the upper chamber portion and the lower chamber portion, and
    a gap hole portion, forming the communication hole portion, is formed between an edge portion of the inner tether and the cushion body section configured to be opened.

7. The cushion of a passenger air-bag apparatus of claim 6, wherein the inner tether comprises:
    a tether body part formed in a shape of a panel and installed across the interior of the cushion body section;
    a front coupling part formed at a front end of the tether body part and coupled to the front portion of the cushion body section; and
    a rear coupling part formed at a rear end of the tether body part and coupled to a rear portion of the cushion body section,
    wherein the gap hole portion is formed between the front coupling part and the rear coupling part by disposing the inner tether to be spaced apart from the cushion body section.

8. The cushion of a passenger air-bag apparatus of claim 7, wherein the gap hole portion comprises:
    a first gap hole portion formed between a left side of the inner tether and the cushion body section; and s a second gap hole portion formed between a right side of the inner tether and the cushion body section.

9. The cushion of a passenger air-bag apparatus of claim 6, wherein the inner tether section comprises a vent hole portion formed to penetrate the inner tether, and configured to form the communication hole portion at a location spaced apart from the gap hole portion.

10. The cushion of a passenger air-bag apparatus of claim 1,
wherein the inner tether section comprises:
an inner tether formed in a shape of a panel and installed at a boundary portion between the upper chamber portion and the lower chamber portion; and
a vent hole portion formed to penetrate the inner tether and configured to form the communication hole portion.

11. The cushion of a passenger air-bag apparatus of claim 1,
further comprising an outer tether section disposed at an upper portion of the lower chamber portion and connected to the lower chamber portion to constrain sagging of the lower chamber portion.

12. The cushion of a passenger air-bag apparatus of claim 11, wherein the outer tether section comprises:
an upper extension portion disposed inside the housing;
a lower extension portion formed in succession with the upper extension portion and configured to extend to outside of the housing;
an assembly portion formed at an end of the upper extension portion and coupled to a fastening portion between an inflator and the housing; and
a bonding portion formed at an end of the lower extension portion and bonded to the lower chamber portion.

13. The cushion of a passenger air-bag apparatus of claim 11, wherein the outer tether section comprises:
an extension portion disposed at an upper portion of the lower chamber portion;
an upper bonding portion formed at an upper portion of the extension portion and bonded to the upper chamber portion; and
a lower bonding portion formed at a lower portion of the extension portion and bonded to the lower chamber portion.

* * * * *